Figure 1:
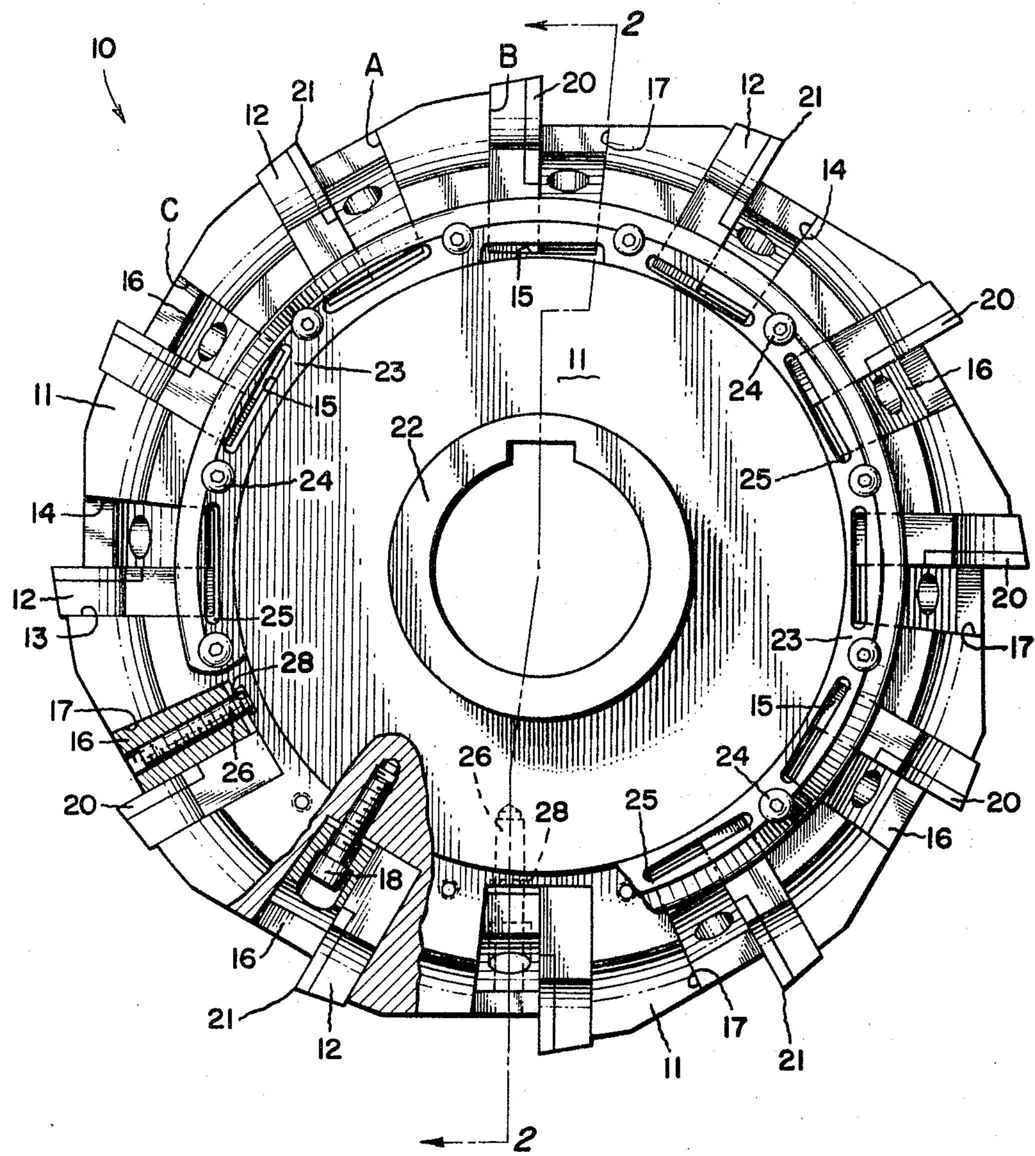

ROTARY MILLING CUTTER AND METHOD OF RESTORING THE SAME

Filed June 15, 1964 2 Sheets-Sheet 1

INVENTORS
CHARLES N. SCHWEITZER, SR.
ALBERT W. CRONIN
SAMUEL B. HARLAN
BY
Arthur Frederick
ATTORNEY INVENTORS
CHARLES N. SCHWEITZER, SR.
ALBERT W. CRONIN
SAMUEL B. HARLAN
BY
Arthur Frederick
ATTORNEY 3,320,655

ROTARY MILLING CUTTER AND METHOD OF RESTORING THE SAME

Charles N. Schweitzer, Sr., Painted Post, and Albert W. Cronin and Samuel B. Harlan, Corning, N.Y., assignors to Ingersoll-Rand Company, New York, N.Y., a corporation of New Jersey Filed June 15, 1964, Ser. No. 374,931
6 Claims. (Cl. 29—105)

This invention relates to cutting devices and more particularly to rotary milling cutters for forming rotors for screw-type and axi-type compressors and pumps and a method of resharpening such milling cutters.

Presently, milling cutters employed in rotor milling machines are constructed with blade-receiving slots of equal depth around the perimeter of the cutter in which cutter blades of equal length are secured. As the blades of this type of rotary milling cutter are worn and reground or sharpened, the contour of the rotor which is machined is thereby altered. If as a result of the wear and the successive regrinding of the blades the diameter of the milling cutter is reduced 1/64 of an inch, the rotors which are being machined by the milling cutter must be finish-filed and fitted to the mating rotor. This factor necessitates a relatively frequent replacement of all the cutter blades to minimize the amount of hand-fitting work. Since each cutter blade is very costly, the relatively frequent replacement of all the cutter blades constitutes a very expensive item of fabrication.

It is, therefore, an object of this invention to provide an improved milling cutter wherein the cutter blades have a longer operative life than the conventional cutter blades.

Another object of the present invention is to provide an improved rotary milling cutter which is capable of being restored to usefulness by the replacement of a single cutter blade and the rearrangement of the other blades.

It is a further object of this invention to provide a rotary milling cutter in which the blades are readily removable without distortion or damage to the milling cutter body.

Accordingly, it is contemplated that the rotary milling cutter and the method of regrinding thereof according to this invention comprise a disc-shaped body having a plurality of cutter blade-receiving slots extending inwardly from the peripheral surface thereof. Each successive slot is progressively deeper than the preceding slot to receive a cutter blade of a progressively larger size than the preceding blade.

To restore the milling cutter to maximum usefulness, after the wear and the regrinding of the cutter blades of the milling cutter result in an excessive deviation in the contour of the rotor which is to be formed—i.e., 1/64 of an inch—it is necessary to remove the blade of the shortest length, regrind the remaining blades, remove each of the blades from its associated slot, and remount it in the next adjacent slot. In the remaining empty slot of the greatest depth, a new blade of the longest length is secured therein, thereby restoring the milling cutter to full diameter and contour. Thus, it can be seen that each blade has a longer, useable life than the blades of conventional milling cutters.

In the milling cutter of this invention, each blade is clamped in its associated slot by a wedge which is held in the slot by a pair of screws. A centrally located screw is disposed in the wedge to abut the bottom of the slot. This screw, when turned to exert a force upon the bottom of the slot, serves as a jack to dislodge the wedge and permit the removal of the blade associated with the wedge.

Figure 2:
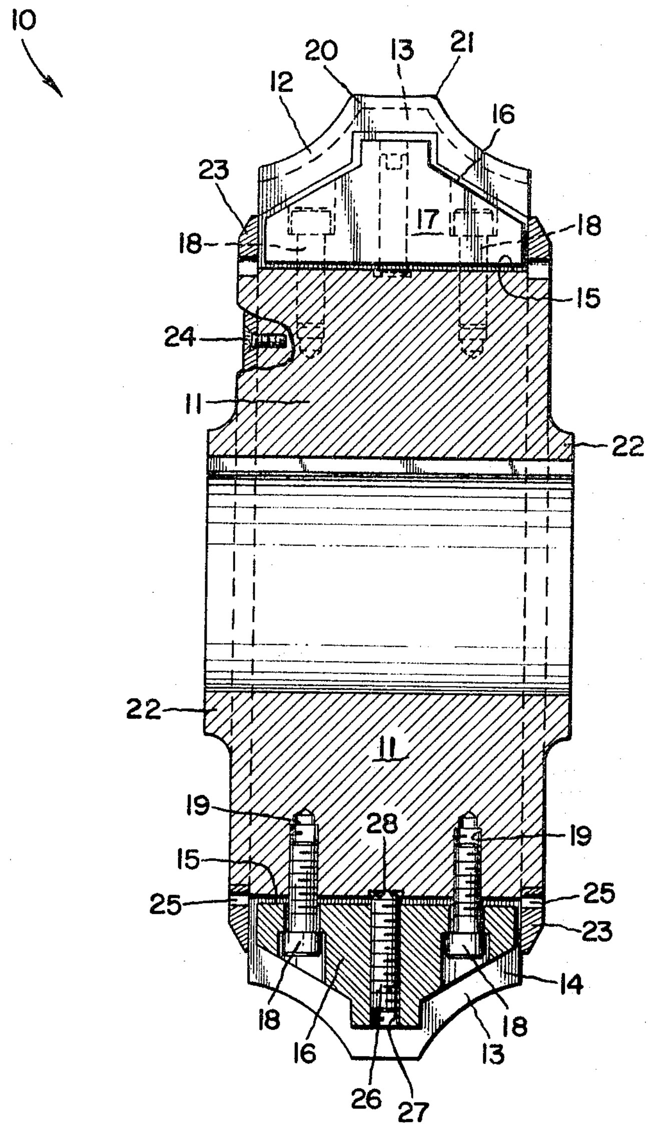

The invention will be more fully understood from the following description when considered in connection with the acompanying drawings in which:

FIG. 1 is a side elevational view of the rotary milling cutter according to this invention; and FIG. 2 is a fragmentary cross-sectional view taken along line 2—2 of FIG. 1.

Now referring to the drawings, the reference numeral 10 generally designates a rotary milling cutter according to this invention which comprises a disc-shaped body 11 supporting a plurality of peripherally projecting contoured blades 12. Body 11 is provided with a plurality of circumferentially spaced tapered slots 13 which extend radially inwardly toward the center of the body. One side wall 14 of each of the slots 13 is inclined so as to extend in a direction from the bottom 15 of a slot in diverging relationship to the opposite wall. In each slot is disposed a blade 12 which is clamped in place within its associated slot by a wedge 16.

Each wedge 16 is dimensioned to fit between each blade 12 and wall 14 of slot 13. Each wedge 16 is also provided with an inclined wall 17 which has a slope substantially complementary to wall 14. The wedges 16 are secured to body 11 and drawn into tight wedging relationship with blades 12 and wall 14 of slot 13 by a pair of screws 18 which are turned into the tapped holes 19 in body 11.

Each of the blades 12 may be provided with a hard metal cutting edge portion 20, such as tungsten carbide, brazed to the blade body.

In accordance with the invention and as viewed in a counterclockwise direction in FIG. 1, the twelve slots 13 are each of progressively greater depth than the preceding slot 13, starting with a slot designated A to a slot designated B. Each successive slot 13 is deeper than the preceding slot by equal increments; as, for example, each slot can be 1/32 of an inch deeper than the preceding slot. Also, each successive slot, starting with slot A and moving counterclockwise to slot B, has a blade 12 of a longer length than the blade in the preceding slot. Each blade is of an equal increment of length longer than the preceding blade—as, for example, 1/32 of an inch longer—so that the cutting edges 21 of all the blades will lie in the same circle about hub 22 of body 11.

The opposite ends of slots 13 are partially closed by the face rings 23 which are secured to body 11 by a plurality of spaced Phillips head screws 24. Each of the rings 23 is provided with slots 25 corresponding in number to the number of slots 13. Slots 25 are arranged so that each slot 25 registers with a slot 13 to serve as clean-out openings by which metal chips and other foreign material may be readily removed from slots 13 before inserting a blade 12 therein.

To provide for easy removal of a blade 12, each wedge is provided with a screw 26 which is turned into a threaded hole 27 in the wedge so that one end of screw 26 extends from the wedge into abutment against a depression 28 in bottom 15 of slot 13. The replacement of a blade 12 is accomplished by first loosening or removing screws 18 and then turning screw 26 to cause the screw to press against depression 28 and thereby force the wedge outwardly from slot 13. With wedge 16 removed or loosened, blade 12 is easily removed from its associated slot.

To restore milling cutter 10 to usefulness after cutting edges 21 of blades 12 have been worn and resharpened so that the length of each of the blades has been reduced—as, for example $1/64$ of an inch—blade 12 in the slot designated A is removed and discarded. The other blades 12 are removed and replaced in the next adjacent slot 13 by first placing blade 12 which is in the slot designated C into the slot 13 designated A and so on counterclockwise around the milling cutter body. A new blade 12 of the longest length is then secured in slot 13 designated B. This rearrangement of the blades and the replacement of one new blade restore the milling cutter to full diameter and proper contour. Blades 12 may be reground before or after being repositioned in slots 13 as described above.

It is believed now readily apparent that the present invention provides a novel milling cutter and a method of restoring the milling cutter which are relatively inexpensive, the method of restoring the milling cutter being accomplished by the replacement of only one new blade. It is a milling cutter in which each blade has a longer operative life than the blades in heretofore-known milling cutters. It is a milling cutter which permits the interchangeability of rotors since hand-mating of the rotors is eliminated. In addition, it provides a milling cutter in which the blade-holding wedges are easily removed without distorting or damaging the cutter body. It is readily apparent that each blade, before it must be discarded, can be reduced in length considerably more than the blades of heretofore-known milling cutters. For example, if each slot is $1/32$ of an inch deeper than the preceding slot and there are twelve slots, the total reduction in length which each blade may be subjected to is $3/8$ of an inch ($12 \times 1/32'' = 3/8''$). In conventional milling cutters all the blades had to be replaced after a reduction in length of $1/8$ of an inch since excessive hand-filing of the rotors became necessary if the cutters were used after such reduction in length.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

We claim:

1. A rotary milling cutter comprising (a) a body, (b) a plurality of spaced, circumferentially arranged, cutting blade-receiving slots, (c) cutting blades of successively longer length disposed in each of said slots with the cutting edge of each blade lying on the same imaginary circle from the center of said body, and (d) an annular ring secured to said body for partially closing an end of said blade receiving slots, said ring being provided with clean out slots registering with said blade receiving slots.

2. A rotary milling cutter comprising (a) a body, (b) a plurality of circumferentially spaced tapered slots, (c) cutting blades of successively longer length disposed in each of said slots with the cutting edge of each blade lying on the same imaginary circle from the center of said body, (d) a tapered wedge disposed in each slot in abutment against the cutting blade therein to secure the latter in its associated slot, (e) a jack screw disposed in a tapped hole in each of said wedges to abut the bottom of the associated seat so that when said jack screw is turned to exert a force against the bottom of said slot the wedge is forced from wedging relationship with the associated cutting blade, and (f) an annular ring secured to said body for partially closing an end of said tapered slots, said ring being provided with clean out slots registering with said tapered slots.

3. The apparatus of claim 2 wherein each of said wedges is provided with a pair of screws which extend through the wedge and into the tapped holes in the cutter body so that when the screws are turned into the tapped holes the associated wedge is drawn into tight wedging relationship with the associated slot and the cutting blade.

4. A rotary milling cutter comprising (a) a disc-shaped body, (b) a plurality of spaced, circumferentially arranged slots in the outer periphery of said body, (c) each successive slot being deeper in depth than the preceding slot, (d) cutting blades of successively longer length disposed in each of the successively deeper slots so that the cutting edges of each of the cutting blades lie on the same imaginary circle, and (e) an annular ring secured to said body for partially closing an end of the slots in said body, said ring being provided with clean out slots registering with the slots in said body.

5. A rotary milling cutter comprising (a) a disc-shaped body, (b) a plurality of spaced, circumferentially arranged slots extending inwardly from the periphery of said body, (c) each successive slot being deeper than the next preceding slot by equal increments of measurement, and (d) a cutting blade disposed in each slot, (e) each of said cutting blades being of a longer length than the preceding blade so that the cutting edges of each of the cutting blades lie in the same imaginary circle, and (f) an annular ring secured to said body for partially closing an end of the slots in said body, said ring being provided with clean out slots registering with the slots in said body.

6. A rotary milling cutter of the Holroyd type comprising (a) a disc-shaped body, (b) a plurality of spaced, circumferential, tapered slots extending inwardly from the periphery of said body, (c) each next adjacent slot being deeper than the next preceding slot by equal increments of measurement, (d) a plurality of cutting blades corresponding in number to the number of slots and varying in equal increments of length, (e) said cutting blades being disposed in each of the slots with the successively longer blades in successively deeper slots so that all of the cutting edges lie in the same imaginary circle, (f) a plurality of wedges, (g) each of said blades being held in its associated slot by a wedge, (h) a tapped hole in each of said wedges extending through the wedge to communicate with the bottom of the slot associated therewith, (i) a jack screw turned in said tapped hole to abut the bottom of the slot so that when the jack screw is turned it exerts a force on the bottom of the slot to drive the wedge out of wedging relationship with the associated slot and the cutting blade, and (j) an annular ring secured to said body for partially closing an end of the slots in said body, said ring being provided with clean out slots registering with the slots in said body.

References Cited by the Examiner

UNITED STATES PATENTS

| | | | |
|---|---|---|---|
| 571,955 | 11/1896 | Phillips | 29—105 X |
| 2,374,528 | 4/1945 | Emde | 29—105 |
| 2,456,842 | 12/1948 | Rutbell | 29—105 |
| 2,567,167 | 9/1951 | Drader | 29—105 |
| 3,138,847 | 6/1964 | Berry | 29—105 |
| 3,175,276 | 3/1965 | Weber | 29—105 |

FOREIGN PATENTS

| | | |
|---|---|---|
| 655,420 | 7/1951 | Great Britain. |
| 928,294 | 6/1963 | Great Britain. |

WILLIAM W. DYER, Jr., *Primary Examiner.*

HARRISON L. HINSON, *Examiner.*